United States Patent
Suzuki et al.

(10) Patent No.: US 8,906,516 B2
(45) Date of Patent: Dec. 9, 2014

(54) GALVANNEALED STEEL SHEET HAVING HIGH CORROSION RESISTANCE AFTER PAINTING

(71) Applicant: JFE Steel Corporation, Tokyo (JP)

(72) Inventors: Yoshitsugu Suzuki, Tokyo (JP); Mai Miyata, Tokyo (JP); Yoichi Makimizu, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/345,663

(22) PCT Filed: Sep. 20, 2012

(86) PCT No.: PCT/JP2012/005958
§ 371 (c)(1),
(2), (4) Date: Mar. 19, 2014

(87) PCT Pub. No.: WO2013/046601
PCT Pub. Date: Apr. 4, 2013

(65) Prior Publication Data
US 2014/0227554 A1    Aug. 14, 2014

(51) Int. Cl.
| | | |
|---|---|---|
| *B32B 15/04* | (2006.01) | |
| *B32B 15/18* | (2006.01) | |
| *C23C 2/06* | (2006.01) | |
| *C23C 30/00* | (2006.01) | |
| *B32B 15/01* | (2006.01) | |
| *C23C 2/26* | (2006.01) | |
| *C23C 2/28* | (2006.01) | |
| *C22C 38/00* | (2006.01) | |
| *C22C 38/38* | (2006.01) | |
| *C22C 38/58* | (2006.01) | |
| *C22C 38/02* | (2006.01) | |
| *C22C 38/04* | (2006.01) | |
| *C22C 38/06* | (2006.01) | |
| *C21D 9/46* | (2006.01) | |

(52) U.S. Cl.
CPC . *B32B 15/01* (2013.01); *C23C 2/06* (2013.01); *C23C 2/26* (2013.01); *C23C 2/28* (2013.01); *C22C 38/00* (2013.01); *C22C 38/38* (2013.01); *C22C 38/58* (2013.01); *B32B 15/013* (2013.01); *C22C 38/02* (2013.01); *C22C 38/04* (2013.01); *C22C 38/06* (2013.01); *C21D 9/46* (2013.01)
USPC ........... 428/659; 428/684; 428/687; 428/219; 428/629; 428/639; 428/632; 428/336; 428/340

(58) Field of Classification Search
CPC ...... B32B 15/04; B32B 15/01; B32B 15/012; B32B 15/043; B32B 15/18; B32B 2605/00; C23C 30/00; C23C 30/005; C23C 2/00; C23C 2/06
USPC ......... 428/659, 684, 687, 212, 213, 215, 216, 428/219, 220, 639, 629, 632, 633, 640, 336, 428/340
See application file for complete search history.

(56) References Cited

U.S. PATENT DOCUMENTS

2010/0186854 A1*   7/2010   Bertrand et al. .............. 148/276

FOREIGN PATENT DOCUMENTS

| JP | 02-225652 A | 9/1990 |
|---|---|---|
| JP | 03-002391 A | 1/1991 |
| JP | 2004-315960 A | 11/2004 |
| JP | 2004-323970 A | 11/2004 |
| JP | 2006-233333 A | 9/2006 |
| JP | 2010-077480 A | 4/2010 |
| JP | 2010-255113 A | 11/2010 |

* cited by examiner

*Primary Examiner* — Michael E La Villa
(74) *Attorney, Agent, or Firm* — DLA Piper LLP (US)

(57) ABSTRACT

A galvannealed steel sheet having high corrosion resistance after painting includes, on a mass percent basis, C: 0.05% to 0.15%, Si: 0.1% to 1.0%, Mn: 0.5% to 2.7%, Al: ≤1.00%, P: ≤0.025%, S: ≤0.025%, and Cr: 0% to 0.8% as chemical components, the remainder being Fe and incidental impurities. The galvannealed steel sheet includes a galvannealed layer in an amount of 20 to 120 g/m² per side, a percentage of exposed zinc metal of the galvannealed layer surface being 20% or more and less than 80%, and an amount of internal oxidation in a region disposed not more than 5 μm from the surface of the steel sheet is 0.02 g/m² or more and 0.1 g/m² or less: Si≤0.68%, Cr≤−1.25Si+0.85, and Si>0.68%, Cr=0, wherein Si and Cr denote respective contents (mass %) of Si and Cr.

2 Claims, No Drawings

GALVANNEALED STEEL SHEET HAVING HIGH CORROSION RESISTANCE AFTER PAINTING

TECHNICAL FIELD

This disclosure relates to a galvannealed steel sheet having high corrosion resistance after painting based on a high-strength steel sheet containing Si.

BACKGROUND

In recent years, surface-treated steel sheets manufactured by rustproofing steel sheets, particularly galvannealed steel sheets which are excellent in rustproofness, have been used in the fields of automobiles, household electrical appliances, and construction materials. From the standpoint of improving the mileage and crash safety of automobiles, the trend of increasing the strength and reducing the thickness of automobile body materials and thereby reducing the weight and increasing the strength of automotive bodies encourages application of high-strength steel sheets to automobiles. To increase strength, there is a direction to high-strength steel sheets that contain Si, which improves strength without reducing ductility, a low-cost strengthening element Mn, and Cr, which improves quenching hardenability. Such galvannealed steel sheets are subjected to electrodeposition coating or general painting before use. Thus, corrosion resistance after painting is important.

Conventional methods of manufacturing a hot-dip coating steel sheet based on a high-strength steel sheet will be exemplified below.

Japanese Unexamined Patent Application Publication No. 2004-323970 discloses a galvanized steel sheet, the coated layer of which is not subjected to an alloying treatment after hot-dip galvanizing. Japanese Unexamined Patent Application Publication No. 2004-315960 discloses a galvannealed steel sheet, the coated layer of which is subjected to an alloying treatment after hot-dip galvanizing. In both cases, the heating temperature in a reduction furnace is specified by a formula including the water vapor partial pressure, and the dew point and the oxygen potential are increased to internally oxidize the surface layer of the base steel. However, JP '970 and JP '960 cannot achieve an excellent characteristic of high corrosion resistance after painting.

Japanese Unexamined Patent Application Publication No. 2006-233333 discloses a technique that sets the concentration of $CO_2$ as well as the oxidizing gases $H_2O$ and $O_2$ to increase oxygen potential to internally oxidize a base steel surface layer immediately before coating and suppress external oxidation, thereby improving the appearance of the coating. However, $CO_2$ may have problems in that it causes furnace pollution and carburization on the surface of steel sheets which affect the mechanical characteristics of the steel sheets. Further, no mention is made of corrosion resistance after painting.

Japanese Unexamined Patent Application Publication No. 2010-77480 A discloses a technique of modifying skin pass rolling conditions to define a flat portion. However, descriptions of corrosion resistance after painting and a surface state that is effective in improving corrosion resistance after painting are not given.

It could therefore be helpful to provide a galvannealed steel sheet having high corrosion resistance after painting.

SUMMARY

We provide high-strength galvannealed steel sheets. High-strength galvannealed steel sheets contain a relatively large amount of Si to increase their strength. Thus, high-strength galvannealed steel sheets manufactured by common methods often have insufficient adhesion of the coating. Thus, the Si concentration of the steel sheet surface layer must be reduced by internal oxidation of Si and the like during hot-rolling and/or annealing. We studied the relationship between corrosion resistance after painting and the state of the coated layer surface, in particular, the relationship between corrosion resistance after painting and the oxidation state of zinc using high-strength galvannealed steel sheets containing internally oxidized Si and the like. We found that corrosion resistance after painting can be improved by specifying the range of the amount of internal oxidation in steel and also the range of the abundance ratio of metallic zinc on the coated layer surface.

Hence, we provide:

[1] A galvannealed steel sheet having high corrosion resistance after painting containing, on a mass percent basis, C: 0.05% to 0.15%, Si: 0.1% to 1.0%, Mn: 0.5% to 2.7%, Al: 1.00% or less, P: 0.025% or less, S: 0.025% or less, and Cr: 0% to 0.8% or less as chemical components, provided that the following formulae are satisfied, the remainder being Fe and incidental impurities, wherein the galvannealed steel sheet includes a galvannealed layer on the surface of a steel sheet, the amount of the galvannealed layer being in the range of 20 to 120 g/m² per side, the percentage of exposed zinc metal of the galvannealed layer surface being 20% or more and less than 80%, and the amount of internal oxidation in a region disposed not more than 5 μm from the surface of the steel sheet is 0.02 g/m² or more and 0.1 g/m² or less:

for Si≤0.68%, Cr≤−1.25Si+0.85, and for Si>0.68%, Cr=0, wherein Si and Cr denote the respective contents (mass %) of Si and Cr.

[2] The galvannealed steel sheet having high corrosion resistance after painting according to [1], further containing at least one element selected from Mo: 0.05% to 1.00%, Nb: 0.005% to 0.050%, Ti: 0.005% to 0.050%, Cu: 0.05% to 1.00%, Ni: 0.05% to 1.00%, and B: 0.001% to 0.005% on a mass percent basis.

The percentages with respect to steel components are based on mass percentage.

We also provide galvannealed steel sheets having high corrosion resistance after painting.

DETAILED DESCRIPTION

Our steel sheets and methods will be described in detail below.

C: 0.05% to 0.15%

C is a strengthening element. This effect requires a C content of 0.05% or more. On the other hand, a C content of more than 0.15% results in poor weldability. Thus, the C content is 0.05% or more and 0.15% or less.

Si: 0.1% to 1.0%

Si is an element effective in strengthening steel and achieving good material property. It is difficult to increase strength at a Si content of less than 0.1%. On the other hand, a Si content of more than 1.0% results in poor adhesion of the coating and deteriorates corrosion resistance after painting. Thus, the Si content is 0.1% or more and 1.0% or less.

Mn: 0.5% to 2.7%

Mn is an element effective in strengthening steel. Strengthening steel requires a Mn content of 0.5% or more. On the other hand, a Mn content of more than 2.7% may result in poor weldability and poor adhesion of the coating, and deteriorates corrosion resistance after painting. Thus, the Mn content is 0.5% or more and 2.7% or less.

Al: 1.00% or Less

Al is an inevitable contaminant. An Al content of more than 1.00% results in poor weldability. Thus, the Al content is 1.00% or less.

P: 0.025% or Less

P is an inevitably contained element. A P content of more than 0.025% results in not only poor weldability but also poor surface quality. This also results in poor adhesion of the coating in a non-alloying treatment. In an alloying treatment, the alloying treatment temperature must be increased to achieve a desired degree of alloying. An increase in alloying treatment temperature to achieve a desired degree of alloying results in both low ductility and poor adhesion of the galvannealed film. Thus, the desired degree of alloying, good ductility, and a good galvannealed film cannot be simultaneously achieved. This results in low corrosion resistance after painting. Thus, the P content is 0.025% or less.

S: 0.025% or Less

S is an inevitably contained element. Although the lowest S content is not particularly specified, a high S content results in poor weldability. Thus, the S content is preferably 0.025% or less.

Cr: 0% to 0.8%; the Cr Content Satisfies the Following Formulae:

$$\text{For } Si \leq 0.68\%, Cr \leq -1.25Si + 0.85.$$

$$\text{For } Si > 0.68\%, Cr = 0.$$

Si and Cr denote the respective contents (mass %) of Si and Cr.

Cr is an element effective in improving quenching hardenability to improve mechanical characteristics. However, addition of Cr and Si at the same time results in low corrosion resistance after painting. This tendency is not observed in the corrosion resistance of bare materials (cold-rolled steel sheets), but is observed in that of galvannealed steel sheets subjected to electrodeposition coating. Although the reason for this is under study, it is probably because both Cr and Si are susceptible to oxidation and their oxides have a dense protective form. If addition of Mn alone is sufficient to improve quenching hardenability, addition of Cr is not necessary. If necessary, the Cr content is 0.8% or less in terms of adhesion of the coating and satisfies the formulae to balance with the Si content in terms of corrosion resistance.

The remainder are Fe and incidental impurities.

To control the balance of strength and ductility, at least one element selected from Mo: 0.05% to 1.00%, Nb: 0.005% to 0.050%, Ti: 0.005% to 0.050%, Cu: 0.05% to 1.00%, Ni: 0.05% to 1.00%, and B: 0.001% to 0.005% may be added if necessary.

The following are reasons that determine the appropriate amounts of these elements to be added.

Less than 0.05% Mo has little effect on strength adjustment. Addition of less than 0.05% Mo together with Nb, Ni, or Cu has little effect in improving the adhesion of the coating. On the other hand, a Mo content of more than 1.00% results in an increased cost. Thus, if necessary, the Mo content is 0.05% or more and 1.00% or less.

Less than 0.005% Nb has little effect on strength adjustment. Addition of less than 0.005% Nb together with Mo has little effect in improving the adhesion of the coating. On the other hand, a Nb content of more than 0.050% results in an increased cost. Thus, if necessary, the Nb content is 0.005% or more and 0.050% or less.

Less than 0.005% Ti has little effect on strength adjustment. On the other hand, more than 0.050% Ti results in poor adhesion of the coating. Thus, if necessary, the Ti content is 0.005% or more and 0.050% or less.

Less than 0.05% Cu has little effect on promoting formation of a residual γ phase. Addition of less than 0.05% of Cu together with Ni or Mo has little effect on improving adhesion of the coating. On the other hand, a Cu content of more than 1.00% results in an increased cost. Thus, if necessary, the Cu content is 0.05% or more and 1.00% or less.

Less than 0.05% Ni has little effect on promoting formation of a residual γ phase. Addition of less than 0.05% of Ni together with Cu and Mo has little effect of improving adhesion of the coating. On the other hand, a Ni content of more than 1.00% results in an increased cost. Thus, if necessary, the Ni content is 0.05% or more and 1.00% or less.

Less than 0.001% B has little effect on promoting quenching hardenability. On the other hand, more than 0.005% B results in poor adhesion of the coating. Thus, if necessary, the B content is 0.001% or more and 0.005% or less. It goes without saying that addition of B is not necessary when no improvement in mechanical characteristics is required.

The amount of coating on the surface of the steel sheet is 20 to 120 g/m$^2$ per side.

When the amount of coating is less than 20 g/m$^2$, it is difficult to assure corrosion resistance. When the amount of coating is more than 120 g/m$^2$, it is difficult to perform an alloying treatment or to assure good adhesion of the coating.

The percentage of exposed zinc metal of the galvannealed layer surface is 20% or more and less than 80%.

Specifying the abundance ratio of metallic zinc of the coated layer surface improves corrosion resistance after painting.

A thin Zn and Al oxide layer derived from the coating bath components is formed on the galvannealed layer surface of the galvannealed steel sheet. When the percentage of exposed zinc metal of the galvannealed layer surface is less than 20%, the Zn and Al oxide impairs chemical conversion treatability and paint adhesion to deteriorate corrosion resistance after painting. In particular, the Zn and Al oxide has a large effect on corrosion resistance after three-coat painting. When the percentage of exposed zinc metal of the galvannealed layer surface is 80% or more, this results in a reduced effect in improving processability due to finely crushing the Zn and Al oxide in press working.

The percentage of exposed zinc metal of the galvannealed layer surface can be determined from the intensity ratio between zinc oxide and zinc metal in an AES spectrum. More specifically, a zinc oxide spectrum at approximately 992 eV is separated from a zinc spectrum at approximately 996 eV on the basis of a standard sample spectrum to quantify the ratio of zinc metal to zinc oxide. Thus, the percentage of zinc metal is obtained and taken as the percentage of exposed zinc metal.

A method of adjusting the percentage of exposed zinc metal of the galvannealed layer surface to be 20% or more and less than 80% is, for example, rolling the steel sheet with a dull roll having a surface roughness Ra of 2.0 μm or more at a rolling reduction of 0.3% or more and 0.8% or less and then rolling the resultant steel sheet with a bright roll having a surface roughness Ra of 0.1 μm or less at a rolling reduction of 0.4% or more and 1.0% or less in skin pass rolling. The rolling reduction with the bright roll must be greater than the rolling reduction with the dull roll. We believe that rolling with the bright roll immediately after rolling with the dull roll can promote the removal of the surface oxide film and thereby the percentage of exposed zinc metal is increased.

The amount of internal oxidation in steel in a region disposed not more than 5 μm from the surface of the steel sheet after removal of the galvannealed layer is 0.02 g/m² or more and 0.1 g/m² or less.

A steel sheet, which is a base steel sheet, contains a relatively large amount of Si to increase the strength of the steel sheet. Thus, the Si concentration of the steel sheet surface layer must be reduced by internal oxidation of Si and the like. When the amount of internal oxidation is less than 0.02 g/m², surface enrichment of Si cannot be sufficiently suppressed. When the internal oxidation layer is more than 0.1 g/m², after the coated layer is corroded and base steel is exposed, salt water can easily enter grain boundaries and the like where oxides are generated and lower corrosion resistance after painting.

The amount of internal oxidation can be determined by chemically removing the coated layer and qualifying the amount of oxygen per side of the steel sheet surface layer portion using an impulse furnace-infrared absorption method. The coated layer may be removed by any method, for example, using diluted hydrochloric acid solution containing an inhibitor, and 20% by weight NaOH aqueous solution containing triethanolamine (inhibitor) to which a small amount of hydrogen peroxide solution is added. The amount of oxygen per side can be quantitatively determined by subtracting the amount of oxygen in the steel of a test specimen from which a portion having a thickness of approximately 0.1 mm on both sides thereof is removed by mechanical grinding from the amount of oxygen in the steel after removal of the coated layer and converting the subtracted amount of oxygen into the amount of oxygen per unit area per side.

0.02 g/m² or more and 0.1 g/m² or less of the internal oxidation layer can be formed by an oxidation-reduction method of setting the temperature in a heating furnace at 600° C. or more to produce a sufficient amount of oxidation in the steel sheet and causing oxygen to diffuse from the oxide film to the steel sheet surface layer during a reduction treatment or a method of performing annealing in an all radiant tube heating type (ART) CGL setting a high dew point in a heating zone.

Since the Si content is 1.0% or less, an oxidation-reduction treatment type direct fired furnace (DFF), a non-oxidizing furnace (NOF) type CGL, or an all radiant tube (ART) type CGL may be used. Slightly higher oxidizing conditions in the heating furnace are preferred in DFF and NOF type CGLs. In the all radiant tube (ART) type CGL, the dew point in the heating zone may be increased to bring oxidizable elements such as Si into an internal oxidation state. These suppress surface enrichment and improve adhesion of the coating and adhesion after painting, which result in improvement of corrosion resistance after painting.

EXAMPLES

Our steel sheets and methods will be specifically described based on the following examples.

A cold-rolled steel sheet (having a thickness of 1.6 mm) having the steel composition listed in Table 1 was charged into a direct fired furnace (DFF) type CGL. In the direct fired furnace (DFF) type CGL, the cold-rolled steel sheet was heated to a temperature of 700° C. to 800° C. in a heating zone with a direct fired burner at an air ratio of 0.95, was then annealed at 820° C. in a soaking zone in a nitrogen gas atmosphere having a hydrogen content of 5% by volume at a dew point of −30° C., and was then subjected to a hot-dip galvanizing treatment in a zinc bath having an Al content of 0.15% by mass at a bath temperature of 460° C. and an alloying treatment. The amount of coating was adjusted to be 50 g/m² (per side) using gas wiping. Skin pass rolling was performed under the conditions shown in Table 2.

The performance of the galvannealed steel sheet obtained as above was evaluated as described below.

Corrosion resistance after painting was evaluated as follows. A steel sheet specimen having a general paint layer was prepared by performing commercially available automotive phosphating, and then forming an electrodeposition coating having a film thickness of 20 μm, an intermediate paint layer having a film thickness of 30 μm, and a topcoat having a film thickness of 30 μm. The surface of the steel sheet specimen cooled to −20° C. was hit by 50 g of iron balls each having a diameter in the range of 1 to 2 mm ejected at 0.1 MPa at a distance of 50 cm from the surface of the steel sheet specimen. Then the steel sheet specimen was subjected to a salt spray test for 240 hours. In the case where blisters from flaws of the film of paint had a diameter of 4 mm or more, the steel sheet was rated poor (cross). In the case where blisters had a diameter of less than 4 mm, the steel sheet was rated good (circle).

Adhesion of the coating was evaluated by bending the coated steel sheet at an angle of 90 degrees and bending it back to its original position, peeling the bent portion with a tape, and measuring the amount of peeled portion per unit length as the Zn count using fluorescent X-rays. According to the following criteria, ranks 1 (circle) and 2 (triangle) had acceptable exfoliation resistance, and rank 3 or higher had unacceptable exfoliation resistance (cross):

Zn count with fluorescent X-rays: Rank
0 to less than 500: 1 (good)
500 or more and less than 1000: 2
1000 or more and less than 2000: 3
2000 or more and less than 3000: 4
3000 or more: 5 (poor).

The appearance of the coating was visually inspected. An uneven appearance was rated poor (cross), and an even appearance was rated good (circle).

TABLE 1

| Symbol for steel sheet | C | Si | Mn | Al | P | S | Cr | Mo | B | Nb | Cu | Ni | Ti | (mass %) |
|---|---|---|---|---|---|---|---|---|---|---|---|---|---|---|
| A | 0.09 | 0.50 | 1.6 | 0.03 | 0.009 | 0.001 | | | | | | | | |
| B | 0.07 | 0.15 | 2.3 | 0.04 | 0.008 | 0.001 | 0.1 | | | | | | | |
| C | 0.09 | 0.15 | 2.3 | 0.03 | 0.010 | 0.002 | 0.6 | | | | | | | |
| D | 0.09 | 0.15 | 2.3 | 0.90 | 0.010 | 0.001 | — | | | | | | | |
| E | 0.03 | 1.00 | 2.0 | 0.03 | 0.010 | 0.003 | — | — | — | — | — | — | — | |
| F | 0.15 | 1.40 | 1.9 | 0.04 | 0.020 | 0.001 | — | — | — | — | — | — | 0.05 | |
| G | 0.15 | 0.80 | 3.2 | 0.03 | 0.010 | 0.003 | — | — | — | — | — | — | — | |
| H | 0.15 | 0.80 | 1.9 | 1.20 | 0.010 | 0.003 | — | — | — | — | — | — | 0.05 | |
| I | 0.15 | 1.50 | 1.6 | 0.03 | 0.035 | 0.001 | — | — | — | — | — | — | — | |
| J | 0.09 | 0.50 | 1.6 | 0.03 | 0.009 | 0.001 | 0.3 | | | | | | | |

TABLE 1-continued (mass %)

| Symbol for steel sheet | C | Si | Mn | Al | P | S | Cr | Mo | B | Nb | Cu | Ni | Ti |
|---|---|---|---|---|---|---|---|---|---|---|---|---|---|
| K | 0.09 | 0.50 | 1.6 | 0.03 | 0.009 | 0.001 | 0.1 | | | | 0.1 | 0.2 | |
| L | 0.09 | 0.50 | 1.6 | 0.03 | 0.009 | 0.001 | | | | 0.01 | | | |
| M | 0.09 | 0.50 | 1.6 | 0.03 | 0.009 | 0.001 | | | 0.002 | | | | |

TABLE 2

| Test No. | Steel type | First skin pass rolling — Reduction roll — Roll type | First skin pass rolling — Reduction roll — Roughness Ra/μm | First skin pass rolling — Rolling reduction/% | Second skin pass rolling — Reduction roll — Roll type | Second skin pass rolling — Reduction roll — Roughness Ra/μm | Second skin pass rolling — Rolling reduction/% | Percentage of exposed Zn/% | Corrosion resistance after painting | Adhesion of coating | Appearance of coating | Amount of internal oxidation/gm² | Note |
|---|---|---|---|---|---|---|---|---|---|---|---|---|---|
| 1 | A | Dull | 2.2 | 0.4 | Bright | 0.1 | 0.5 | 60 | ○ | ○ | ○ | 0.05 | Example 1 |
| 2 | B | Dull | 2.2 | 0.4 | Bright | 0.1 | 0.5 | 50 | ○ | ○ | ○ | 0.04 | Example 2 |
| 3 | C | Dull | 2.2 | 0.4 | Bright | 0.1 | 0.5 | 40 | ○ | ○ | ○ | 0.07 | Example 3 |
| 4 | D | Dull | 2.2 | 0.4 | Bright | 0.1 | 0.5 | 40 | ○ | ○ | ○ | 0.08 | Example 4 |
| 5 | E | Dull | 2.2 | 0.4 | Bright | 0.1 | 0.5 | 40 | ○ | ○ | ○ | 0.02 | Example 5 |
| 6 | F | Dull | 2.2 | 0.4 | Bright | 0.1 | 0.5 | 40 | x | x | ○ | 0.01 | Comparative Example 1 |
| 7 | G | Dull | 2.2 | 0.4 | Bright | 0.1 | 0.5 | 40 | x | x | ○ | 0.05 | Comparative Example 2 |
| 8 | H | Dull | 2.2 | 0.4 | Bright | 0.1 | 0.5 | 40 | ○ | x | ○ | 0.06 | Comparative Example 3 |
| 9 | I | Dull | 2.2 | 0.4 | Bright | 0.1 | 0.5 | 40 | x | x | ○ | 0.03 | Comparative Example 4 |
| 10 | J | Dull | 2.2 | 0.4 | Bright | 0.1 | 0.5 | 40 | x | x | x | 0.05 | Comparative Example 5 |
| 11 | A | Dull | 2.2 | 0.2 | Bright | 0.1 | 0.3 | <u>15</u> | x | ○ | ○ | 0.05 | Comparative Example 6 |
| 12 | A | Bright | 0.1 | 0.5 | Dull | 2.2 | 0.4 | <u>15</u> | x | x | x | 0.05 | Comparative Example 7 |
| 13 | A | Dull | 2.2 | 1 | Bright | 0.1 | 1.1 | <u>90</u> | ○ | x | x | 0.05 | Comparative Example 8 |
| 14 | A | Dull | 2.2 | 0.9 | — | — | — | <u>15</u> | x | ○ | ○ | 0.05 | Comparative Example 9 |
| 15 | A | Bright | 0.1 | 0.9 | — | — | — | <u>13</u> | x | x | x | 0.05 | Comparative Example 10 |
| 16 | A | Dull | 3 | 0.4 | Bright | 0.1 | 0.5 | 60 | ○ | ○ | ○ | 0.05 | Example 6 |
| 17 | B | Dull | 2.2 | 0.4 | Bright | 0.1 | 0.8 | 80 | ○ | ○ | ○ | 0.05 | Example 7 |
| 18 | C | Dull | 2.2 | 0.3 | Bright | 0.1 | 0.4 | 30 | ○ | ○ | ○ | 0.05 | Example 8 |
| 19 | D | Dull | 3 | 0.8 | Bright | 0.1 | 0.9 | 80 | ○ | ○ | ○ | 0.05 | Example 9 |
| 20 | E | Dull | 2.2 | 0.5 | Bright | 0.1 | 0.6 | 60 | ○ | ○ | ○ | 0.05 | Example 10 |
| 21 | K | Dull | 2.2 | 0.4 | Bright | 0.1 | 0.5 | 60 | ○ | ○ | ○ | 0.05 | Example 11 |
| 22 | L | Dull | 2.2 | 0.4 | Bright | 0.1 | 0.5 | 60 | ○ | ○ | ○ | 0.05 | Example 12 |
| 23 | M | Dull | 2.2 | 0.4 | Bright | 0.1 | 0.5 | 60 | ○ | ○ | ○ | 0.05 | Example 13 |

As is clear from Table 2, our galvannealed steel sheets had satisfactory adhesion of the coating, appearance of the coating, and corrosion resistance after painting, irrespective of being high-alloy steel containing a large amount of oxidizable elements such as Si.

On the other hand, Comparative Examples had poor adhesion, appearance of the coating, and/or corrosion resistance after painting.

The invention claimed is:

1. A galvannealed steel sheet having high corrosion resistance after painting, the steel sheet comprising, on a mass percent basis, C: 0.05% to 0.15%, Si: 0.1% to 1.0%, Mn: 0.5% to 2.7%, Al: 1.00% or less, P: 0.025% or less, S: 0.025% or less, and Cr: 0% to 0.8% as chemical components, the remainder being Fe and incidental impurities, wherein the galvannealed steel sheet includes a galvannealed layer on at least one surface of a steel sheet in an amount of 20 to 120 g/m² per side, a percentage of exposed zinc metal relative to a total amount of exposed zinc oxide and zinc metal on the galvannealed layer surface being 20% or more and less than 80%, and an amount of internal oxidation in a region disposed not more than 5 μm from the surface of the steel sheet is 0.02 g/m² or more and 0.1 g/m² or less, and wherein the steel sheet satisfies the following formulae:

$$Si \leq 0.68\%, Cr \leq -1.25Si + 0.85, \text{ and}$$

$$Si > 0.68\%, Cr = 0,$$

wherein Si and Cr denote respective contents (mass %) of Si and Cr.

2. The galvannealed steel sheet according to claim 1, wherein the steel sheet further comprises at least one element selected from Mo: 0.05% to 1.00%, Nb: 0.005% to 0.050%, Ti: 0.005% to 0.050%, Cu: 0.05% to 1.00%, Ni: 0.05% to 1.00%, and B: 0.001% to 0.005% on a mass percent basis.

* * * * *

UNITED STATES PATENT AND TRADEMARK OFFICE
CERTIFICATE OF CORRECTION

| | | |
|---|---|---|
| PATENT NO. | : 8,906,516 B2 | Page 1 of 1 |
| APPLICATION NO. | : 14/345663 | |
| DATED | : December 9, 2014 | |
| INVENTOR(S) | : Suzuki et al. | |

It is certified that error appears in the above-identified patent and that said Letters Patent is hereby corrected as shown below:

On the Title Page

Item (30) Foreign Application Priority Data has been omitted. Please insert -- JAPAN 2011-208331 09/26/2011 --.

Signed and Sealed this
Thirtieth Day of June, 2015

Michelle K. Lee
*Director of the United States Patent and Trademark Office*